United States Patent Office 2,943,117
Patented June 28, 1960

2,943,117
BUTADIENE DIMERIZATION

Anthony H. Gleason, Scotch Plains, N.J., assignor to Esso Research and Engineering Company, a corporation of Delaware No Drawing. Filed Nov. 26, 1958, Ser. No. 776,451

14 Claims. (Cl. 260—666)

The present invention relates to the preparation of the dimer of butadiene-1,3, which polymer is 4-vinylcyclohexene-1. The invention relates particularly to an improved thermal process for the preparation of 4-vinylcyclohexene-1 by polymerization of butadiene-1,3 in the presence of an additive and if desired also a diluent, so as to prevent the formation of undesired high molecular weight oily polymers and also solid higher polymer gel deposits.

Ordinarily, in thermal butadiene dimerization processes high molecular weight oily polymers are formed in small quantities along with gel type polymers which tend to foul the reactor and transfer lines. These, of course, interfere with the formation of the desired dimer and also reduce the yield of product obtained. The so-called dimer is useful as an intermediate in preparing aromatic compounds from aliphatic hydrocarbons as it can be readily dehydrogenated to an aromatic derivative and is also useful for other purposes.

It is the primary object of the present invention to provide a process whereby improved yields of 4-vinylcyclohexene-1 are obtained from butadiene-1,3 and in which problems of reactor fouling due to gel formations are eliminated or are greatly reduced. This problem of gel formation is quite serious since the gel is of the "popcorn" variety which tends to grow at an exponential rate once it is laid down on reactor or transfer line surfaces. It thus can force frequent shutdown of the entire reactor unit.

According to the present invention, butadiene is dimerized at temperatures between 130 and 160° C., preferably 140–160° C., e.g. 160° C. under high average pressures of 400–1200 p.s.i.g. preferably of about 500–600 p.s.i.g., e.g. 550 p.s.i.g., using rather small quantities in the order of 1–5 wt. percent, preferably 2–4 wt. percent, e.g. 3 wt. percent, of aqueous ammonia or dialkyl amines along with preferably a diluent. The dialkyl amines may have from 4–8 carbon atoms, and the alkyl groups may be the same or mixed. The diluent may be any of the well known aromatic solvents, preferably benzene homologs such as benzene or toluene; chlorinated paraffins such as ethylene dichloride; and the substantially peroxide free dimer itself. The dimer, 4-vinylcyclohexene-1 is subject to the formation of peroxide upon standing in air and these peroxides promote the formation of gel and higher polymer. It is therefore necessary to exclude air from the dimer if it is stored, before recycling or alternatively the dimer may be treated with sodium to remove these peroxides. The diluent is used in amounts of 20–50 wt. percent, based on the total feed, preferably 25–35 wt. percent, e.g. 30 wt. percent.

Polymerization time is 8 to 25 hours, preferably 15 to 20 hours, e.g. 16 hours. Of course, within the ranges given the time required for dimerization decreases as temperatures and pressures increase. Selectivity of conversion to the desired 4-vinylcyclohexene-1 is greater than 95% and conversions of butadiene of above 90% are obtained at temperatures in the range of 140–160° F. using reaction times of above 16 hours. Of course, in the operation of the process it may be desired to react the butadiene for a shorter time to obtain a smaller conversion and recycle product or to separate unreacted butadiene from the product and recycle said butadiene. In all instances, of course, it is desirable to use as the diluent a material such as the dimer itself or a material which is readily separable from the dimer product. If the process is operated so as to obtain low conversions, additionally the diluent should be readily separable from butadiene.

High pressures, e.g. of the order of 400–1200 p.s.i.g., are employed in the process. Lower pressures are used where larger amounts of diluent are used. Higher temperatures, preferably those up to and not higher than the critical temperature of the butadiene (163° C.), also provide accelerated reaction times.

Although it is known that antioxidants will reduce gel and oily polymer formation to a limited extent, it is also known that they will not eliminate the formation of these higher polymers completely at the temperatures found suitable for a reasonable rate of dimerization (130–160° C.). Likewise, it is known that soluble copper salts such as copper naphthenate, act as strong inhibitors of higher polymer formation but only in the temperature range of 100–120° C., which is too low for practical reaction rates.

Data has now been obtained in batch laboratory operations, that will be hereinunder described, which indicate that if 1–5 wt. percent of aqueous solutions of ammonia or of dialkylamines are added to the butadiene, in the presence of 20–50 percent, preferably 25–35 wt. percent based on total feed of a diluent, gel formation is completely eliminated and oily liquid polymer formation is reduced to only about 2% of the butadiene charge. If aqueous ammonia is used it is preferred to use concentrated 28% ammonia. However, it is contemplated that larger amounts of a more dilute ammonia may also be used.

The following experiments, reported in the table below, were all obtained in a laboratory 3½ liter, stainless steel bomb filled to about 2½ liters with liquid butadiene, additive (and diluent if any) at 0° C. The bomb was then sealed and the temperature was raised to the desired levels reported in the chart, pressures increasing autogenously. For example, where no diluent or additive was used, the maximum pressure rose to 1000 p.s.i. upon heating to 125° C., then dropped to 500 p.s.i. after about two hours, and at the end of the run after cooling to 25° C. the pressure was negligible. In all the following runs, conversions of butadiene were above 90 wt. percent except where temperatures of 120 and 110° F. were used (marked with an asterisk), in which cases only 75% by weight conversion and 55% by weight conversion were obtained, respectively in the specified times. Where a noticeable precipitation of gel was obtained in the bomb, this was reported in the table as (+) and where no gel was noticeable this was reported as (−).

*Butadiene dimerization runs*

| Additive, wt. percent on C₄H₆ | Diluent, wt. percent of Total Feed | Temp., °C. | Time, Hours | Gel | Percent by wt. Higher Polymers |
|---|---|---|---|---|---|
| None | None | 150 | 16 | + | 6.5 |
| Hydroquinone 0.2 | do | 130-50 | 18 | + | 5.7 |
| α naphthol 0.2 | do | 130 | 40 | + | |
| Cu naph. 1.0 | do | 135-160 | 20 | − | 10 |
| Cu naph. 2.0 | do | 135-160 | 20 | − | 5.4 |
| Cu naph. 3.0 | do | 130 | 65 | − | 9 |
| Cu naph. 3.0 | do | 130-155 | 20 | − | 6.3 |
| Cu naph. 1.6 | do | 120* | 65 | − | 1.4 |
| Cu naph. 2.0 | do | 110* | 65 | − | 0 |
| aq. NaOH 15 | do | 125-150 | 24 | − | 6 |
| Fe naph. 1.0 | do | 135-160 | 24 | + | |
| Pb naph. 1.0 | do | 135-160 | 24 | + | |
| Aniline 4 | do | 160 | 20 | + | |
| aq. NH₃ 2 | do | 160 | 18 | + | |
| α naphthol 1.0 | dimer 30 | 140-160 | 16 | − | 13 |
| Benzoyl Perox. 0.7 | naphtha 30 | 160 | 20 | − | 10.0 |
| None | dimer 30 (with sodium pretreat) | 160 | 20 | − | 4.5 |
| Do | dimer 30 | 140-160 | 16 | − | 17 |
| Water 2 | benzene 30 | 160 | 20 | − | 18 |
| benzoyl perox. 1.4 | dimer 30 | 160 | 20 | − | 3.7 |
| anh. NH₃ 1.2 | benzene 30 | 160 | 17 | + | 2.1 |
| isopropyl amine 1.8 | do | 160 | 21 | + | 6.6 |
| Aniline 6 | do | 140-160 | 17 | − | 4.5 |
| n-butyl amine 3 | do | 140-160 |  | − | 7.5 |
| water 3 | dimer 30 | 160 | 18 | − | 9.9 |
| aq. NH₃ 3 | do | 160 | 18 | − | { 9.3 / 11.1 } |
| None | naphtha 30 | 160 | 18 | + | |
| Do | cyclohexane 40 | 160 | 18 | + | |
| Do | butenes 30 | 160 | 18 | + | |
| Do | 3 methyl pentane 35 | 160 | 18 | + | |
| Do | ethyl ether 30 | 160 | 18 | + | |
| Do | toluene 40 | 160 | 18 | − | |
| Do | benzene 30 | 165 | 25 | − | 9 |
| Do | ethylene dichloride 50 | 145-165 | 16 | − | 13.5 |
| aq. NH₃ 3 | benzene 30 | 160 | 17 | − | { 2.1 / 2.1 } |
| aq. NH₃ 3 | do | 160 | 17 | − | { 2.5 / 2.5 } |
| diethyl amine 1.8 | do | 160 | 21 | − | { 2.1 / 2.1 } |

It should be noted that in all cases but one where the dimer was used as the diluent, poor results were obtained. This was due, at least in part, to the fact that the dimer used had been exposed to the air for a considerable period and this needed a sodium treatment to remove the peroxides formed. These peroxides, of course, catalyze the formation of higher polymers. In commercial operations such a treatment to remove peroxides would not be required since the polymer need not be exposed to the air.

What is claimed is:

1. The process of thermally dimerizing butadiene-1,3 to produce 4-vinylcyclohexene-1 which comprises maintaining the butadiene at a temperature of 130 to 160° C. in the presence of 1-5 wt. percent based on butadiene of an additive selected from the group consisting of aqueous ammonia and dialkyl amines and 20-50 wt. percent based on feed of a diluent selected from the group consisting of peroxide free butadiene dimer, benzene and benzene homologs and chlorinated paraffins to obtain a substantial yield of the dimer.

2. The process of claim 1 in which temperatures are maintained in the range of 140-160° C.

3. The process of claim 1 in which the feed materials are held at conversion temperatures for 8 to 25 hours.

4. The process of claim 1 in which the feed materials are held at conversion temperature for 15 to 20 hours and in which at least 90% conversion of butadiene is obtained.

5. The process of claim 1 in which the diluent is benzene.

6. The process of claim 1 in which the diluent is the dimer, 4-vinylcyclohexene-1.

7. The process of claim 1 in which the additive is concentrated aqueous ammonia.

8. The process of thermally dimerizing butadiene-1,3 to produce 4-vinylcyclohexene-1 which comprises maintaining the butadiene at a temperature of 130 to 160° C. in the presence of 2-4 wt. percent based on butadiene of an additive selected from the group consisting of aqueous ammonia and dialkyl amines and 25-35 wt. percent based on feed of a diluent selected from the group consisting of peroxide free butadiene dimer, benzene and benzene homologs, and chlorinated paraffins to obtain a substantial yield of the dimer.

9. The process of claim 8 in which temperatures are maintained in the range of 140-160° C.

10. The process of claim 8 in which the feed materials are held at conversion temperatures for 8 to 25 hours.

11. The process of claim 8 in which the feed materials are held at conversion temperature for 15 to 20 hours and in which at least 90% conversion of butadiene is obtained.

12. The process of claim 8 in which the diluent is benzene.

13. The process of claim 8 in which the diluent is the dimer, 4-vinylcyclohexene-1.

14. The process of claim 8 in which the additive is concentrated aqueous ammonia.

References Cited in the file of this patent

UNITED STATES PATENTS

| 2,401,414 | Doumani et al. | June 4, 1946 |
| 2,438,041 | Dutcher | Mar. 16, 1948 |
| 2,867,672 | Hemmerich | Jan. 6, 1959 |